Sept. 25, 1956　　　　W. J. TELL　　　　2,764,078
VENTILATING SYSTEM
Filed June 15, 1951
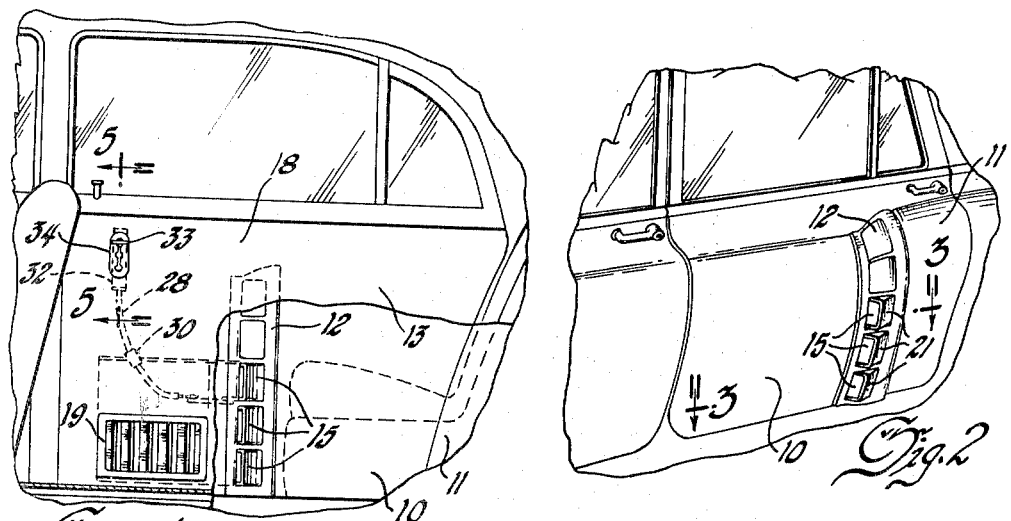
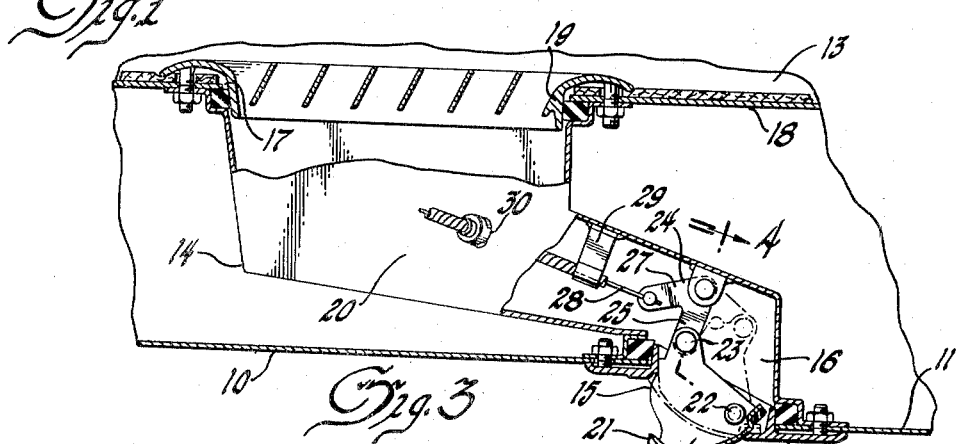
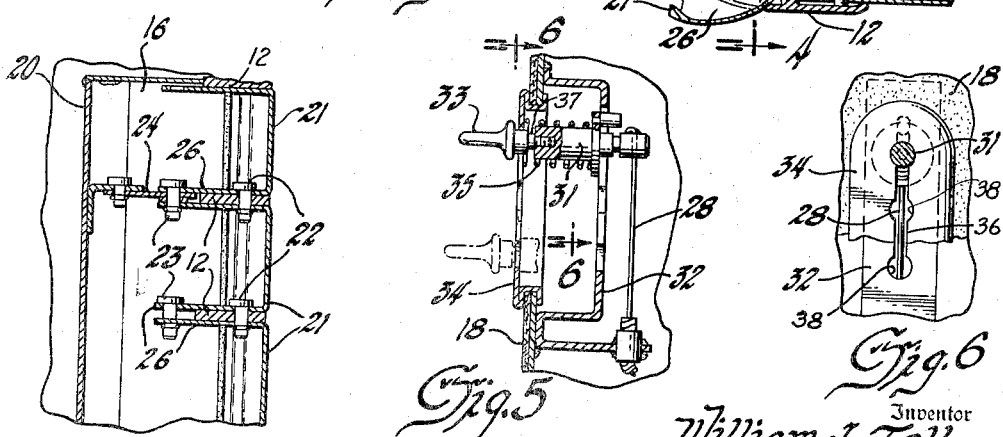
Inventor
William J. Tell
By Willits, Helwig & Baillio
Attorneys

United States Patent Office 2,764,078
Patented Sept. 25, 1956

2,764,078

VENTILATING SYSTEM

William J. Tell, Holly, Mich., assignor to General Motors Corporation, Detroit, Mich., a corporation of Delaware Application June 15, 1951, Serial No. 231,741

9 Claims. (Cl. 98—2)

The invention relates to a ventilating system for a vehicle. In the construction of an automobile, there is the ever-present problem of providing suitable ventilation for the occupants. Although the present invention is adaptable to use in the front seat of a vehicle, it is particularly designed to provide a regulable ventilating system for the rear seat occupants. The present invention provides a system wherein not only the quantity of ventilating air is controlled, but one which also controls the quality in the sense of the velocity or impact with which the air is delivered within the vehicle.

It is an object of the invention to provide a ventilating system which is simple to operate and which insures maximum control over the air received within the vehicle. It is also an object to provide a ventilating system which may be conveniently combined with the normally existing structure of the vehicle so as to not disrupt the appearance thereof. It is a further object to provide means for remotely controlling the rear seat ventilating system. An additional object of the invention is to provide a ventilating system in which the velocity of the air as received is substantially reduced when delivered within the vehicle compartment.

Certain other objects and advantages will appear from the description of the system which follows.

In the drawing:

Figure 1 is a fragmentary cutaway view from within the vehicle rear seat compartment showing the general arrangement of the ventilating system.

Figure 2 is a fragmentary external view showing the disposition of the air intake for a ventilating system.

Figure 3 is a sectional view substantially along line 3—3 of Figure 2 showing the operative relation of the components of the ventilating system and particularly the air intake control mechanism.

Figure 4 is a sectional view substantially along line 4—4 of Figure 3 showing further detail on the air intake control.

Figure 5 is a sectional view substantially along line 5—5 of Figure 1 showing the contruction of the air intake operating handle.

Figure 6 is a sectional view substantially along the line 6—6 of Figure 5 showing further detail of the construction of the air intake operating handle.

The construction and operation of the ventilating system may be best understood by reference to the description below.

In the drawing, a vehicle rear door is designated at 10. Forming part of the outer wall of the door 10 is a fender 11. Mounted exteriorly of said fender is a protective shield or guard 12 which prevents or reduces the possibility of having the leading edge of the fender damaged by dislodged stones or the like.

To provide a ventilating system for a rear passenger compartment 13, an air distributor 14 has been combined with the fender guard 12. The guard and the adjacent fender portion are perforated to provide air inlets 15. In the present instance is shown a fender guard 12 having three such air inlets formed therethrough with other ornamental replicas formed thereabove. Mounted adjacent the air inlets 15 is a receiving chamber 16. An outlet 17 is formed in the compartment wall 18 for the purpose of dispensing ventilating air. A register 19 having louvers spaced therein is mounted over the outlet 17 in order to direct the flow of air as well as to dress outlet 17. Operatively connecting the receiving chamber 16 and the register 19 is a conduit 20.

Conduit 20 has been particularly constructed to function as an air controlling means as well as an air conveying means. As will be seen directly, said conduit has been designed to alter the velocity characteristics of the ventilating air flowing into compartment 13. As may be seen in Figure 3, conduit 20 is forwardly disposed relative to the air intakes 15 resulting in a change of direction of air flow. It is also to be noted that the conduit diverges from the air intakes 15 towards the outlet 17 such that the cross-sectional area and hence the volume of the conduit increases from the inlet to the discharge end. By so increasing the volume of conduit 20 and changing the direction of the flow of air therethrough, the kinetic energy of the air is substantially reduced in passing through the air distributor. Therefore, without sacrificing the volume of ventilating air available, the velocity with which said air enters the compartment 13 is substantially reduced thus avoiding unreasonable drafts on the occupants.

In order to vary or eliminate entirely the quantity of ventilating air entering the compartment 13, air scoops or covers 21 are adapted to operate in conjunction with air intakes 15. Scoops 21 are pivotally mounted on the fender guard 12 by pins 22. Each scoop is secured to the adjacent scoop by a pin 23 thereby enabling movement of one of the scoops to cause movement of all of the scoops.

To permit the remote controlling of covers 21, an operating mechanism has been provided therefor. Pivotally secured within conduit 20 adjacent scoops 21 is a bell crank lever 24. Leg 25 of lever 24 is pivotally connected to a projection 26 on one of the scoops 21. The other leg 27 of lever 24 is connected to an operating member 28, the movement of which rocks the lever 24 which in turn rotates the scoops 21 between their open and closed positions. It will be noted that the pivotal movement of bell crank 24 about its axis causes leg 25 to move in an arc overlapping the arc of the movement of the projection 26 of the scoop 21 connected thereto. Although a lost motion connection might be provided, as within leg 25 of the bell crank for example, in the present instance the duct work of the air distributor 14, upon which the bell crank lever is mounted, is sufficiently pliable to yield during the opening and closing of air scoops 21 and thereby is adapted to act as an over-centering means to bias the air scoops in an open or closed position. Operating member 28 is preferably a Bowden wire supported by a bracket 29 secured within conduit 20. The member 28 passes out of a conduit 20 through a perforation 30 and is secured to a control lever 31 suitably mounted in a housing 32 secured to wall 18 of compartment 13. A knob 33 is secured to the control lever 31. The knob 33 is biased by a spring 35 to bear against plate 34 and is receivable in any of a number of openings 38 formed within the plate along the guide slot 36. When the knob 33 is pulled outwardly from one of the openings 38 the undercut portion 37 of the control lever 31 may be moved along the guide slot 36 until the knob is released and engaged within another of the position selecting openings 38.

It will thus be seen that the present invention provides an easily integrated ventilating system which not only controls the quantity but also the quality of the ventilating air delivered to the rear seat of the vehicle.

Although the invention has been shown in a particular form for the sake of illustration, it is apparent that minor structural changes could be made within the scope of my invention as disclosed.

I claim:

1. In a vehicle rear passenger compartment ventilating system including a fender having an opening formed therein, a guard for said fender, an air intake opening formed in said guard and registering with said fender opening, cover means pivotally mounted on said guard and disposed within said openings, a register disposed within said compartment, a conduit operatively connecting said register and said air intake opening, and control means for operating said cover means to regulate the quantity of ventilating air received within said opennigs, said control means comprising a bell crank lever pivotally secured to said conduit and including a control element secured to said bell crank lever, one arm of said lever being pivotally connected to said cover and the other arm thereof being pivotally secured to one end of said control element, and a multi-position operating handle secured to the other end of said control element and mounted within said rear passenger compartment.

2. In a ventilation system comprising a vehicle body having perforations therein, a perforated guard for said body having the perforations thereof adapted to register with the perforations in said body, an air intake, said intake including a plurality of scoops pivotally mounted on said guard, a receiving chamber adjacent said scoops, a register disposed within a passenger compartment, a conduit connecting said register and said receiving chamber, and control means for operating said scoops in unison to regulate the quantity of ventilating air received thereby, said control means comprising a bell crank lever adapted to be secured within said conduit and a control element connected thereto, one arm of said lever being pivotally connected to said cover and the other arm being pivotally secured to one end of said control element, and a multi-position operating handle secured to the other end of said control element.

3. In a ventilation system comprising a vehicle body having perforations therein, a perforated guard for said body having the perforations thereof adapted to register with the perforations in said body, an air intake, said intake including a plurality of scoops pivotally mounted on said guard, a receiving chamber adjacent said scoops, a register disposed within a passenger compartment, a conduit connecting said register and said receiving chamber, said conduit being constructed so as to diverge from the air intake toward the register and also to change the direction of air flow as received from said air intake, and control means for operating said scoops in unison to regulate the quantity of ventilating air received thereby, said control means comprising a bell crank lever adapted to be secured within said conduit and a control element, one arm of said lever being pivotally connected to said cover and the other arm being pivotally secured to one end of said control element, and a multi-position operating handle secured to the other end of said control element.

4. Ventilating means for use with vehicles having adjacently disposed and parallel outer vehicle walls including a stepped wall section connecting said vehicle walls and disposed in the normal path of air flow parallel to said walls, an air inlet opening formed through said stepped wall section, air scoop means pivotally connected to one of said vehicle walls and disposed within said air inlet opening, and means operatively connected to said air scoop means for pivotally moving said scoop means to open and close said air inlet opening.

5. Ventilating means as provided for by claim 4 which include having said air scoop means pivotal about an axis substantially in the plane of the outermost of said walls and means engaging said air scoop means for limiting the open disposition thereof to lie substantially in the plane of the outermost of said vehicle walls.

6. Ventilating means substantially as provided for by claim 4 which include means interconnecting said scoop means and scoop moving means for limiting said scoop means in its open disposition to lie substantially in the plane of the outermost of said vehicle walls and the closed disposition of said scoop means in general contiguous relation to said stepped wall section.

7. Vehicle ventilating means for use with vehicles having adjacently disposed and substantially parallel spaced side and fender vehicle walls including a stepped wall section connecting said vehicle walls, a member for securement to said stepped wall section, registering air inlet openings formed through said member and said stepped wall section, air scoop means pivotally connected to said member adjacent the outer of said walls and disposed within said air inlet openings, and means operatively connected to said air scoop means for pivotally moving said scoop means to open and close said air inlet openings.

8. Ventilating means as provided for by claim 7 which include means engaging said air scoop means for limiting said scoop means in its open disposition to lie substantially in the plane of the outermost of said vehicle walls.

9. Ventilating means as provided for by claim 7 which include means interconnecting said scoop means and scoop moving means for disposing said scoop means substantially in the plane of the outermost of said vehicle walls for opening said inlet and in general contiguous relation to said stepped wall section for closing said inlet opening.

References Cited in the file of this patent

UNITED STATES PATENTS

| | | |
|---|---|---|
| 1,290,936 | Duckham et al. | Jan. 14, 1919 |
| 1,846,552 | Haskins | Feb. 23, 1932 |
| 2,033,731 | Nallinger | Mar. 10, 1936 |
| 2,039,403 | Gillette | May 5, 1936 |
| 2,189,406 | Roberts | Feb. 6, 1940 |
| 2,255,850 | Kurth | Sept. 16, 1941 |
| 2,388,419 | Komenda | Nov. 6, 1945 |
| 2,523,104 | Emmert | Sept. 19, 1950 |
| 2,557,908 | Cross | June 19, 1951 |
| 2,581,072 | Brezek | Jan. 1, 1952 |